G. H. SMITH.
BEET TOPPER.
APPLICATION FILED DEC. 16, 1913.
1,301,328.
Patented Apr. 22, 1919.
3 SHEETS—SHEET 2.
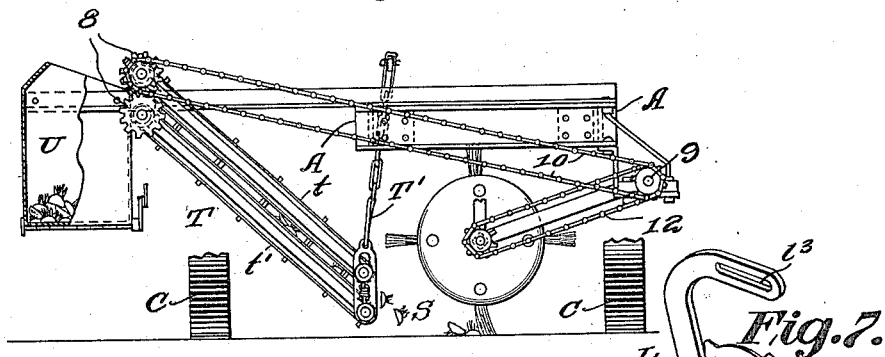
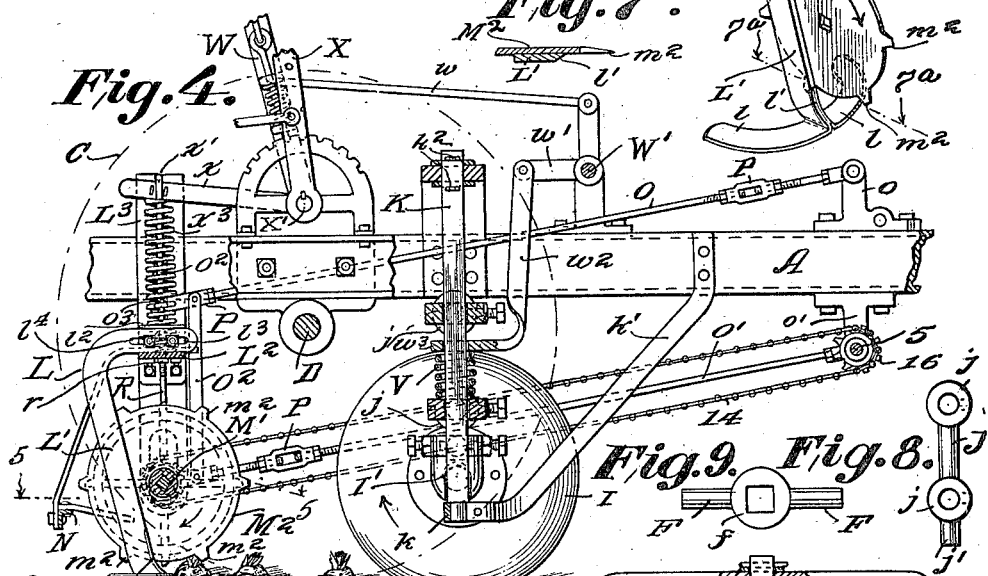
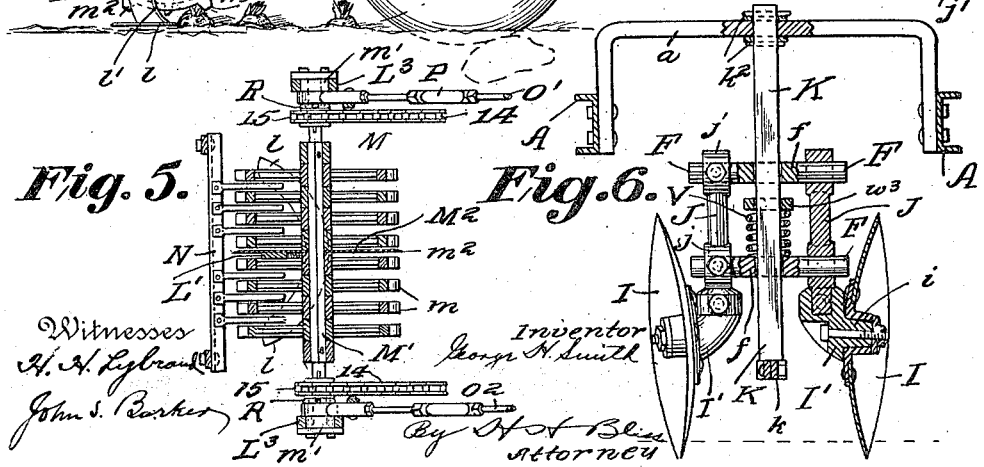
Witnesses
Inventor
George H. Smith
By H. H. Bliss
Attorney

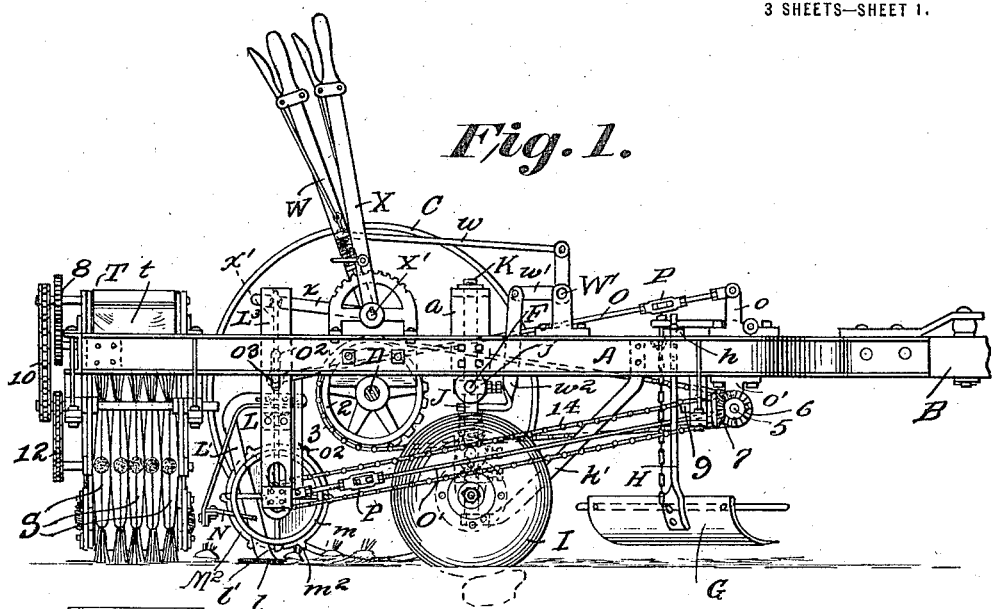

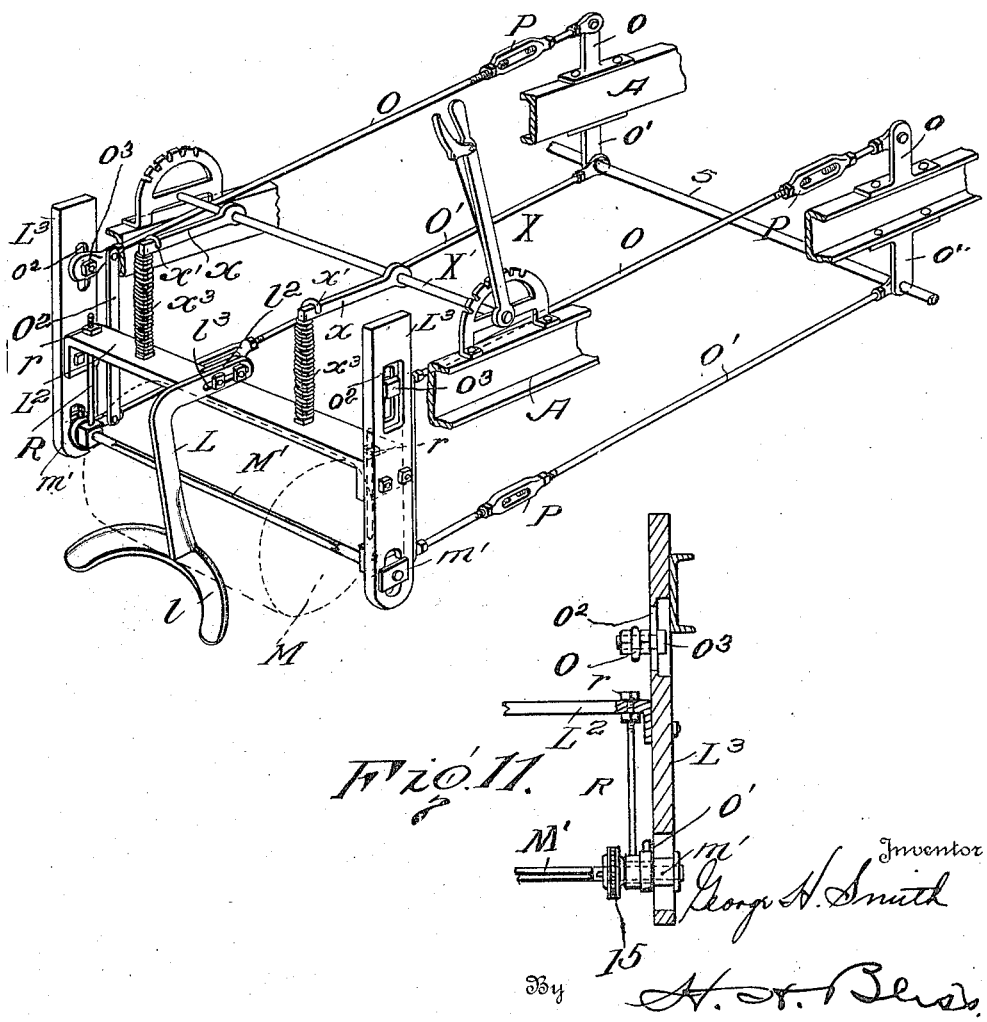

UNITED STATES PATENT OFFICE.

GEORGE H. SMITH, OF COLUMBUS, OHIO.

BEET-TOPPER.

1,301,328.

Specification of Letters Patent.

Patented Apr. 22, 1919.

Application filed December 16, 1913. Serial No. 807,046.

*To all whom it may concern:*

Be it known that I, GEORGE H. SMITH, a citizen of the United States, residing at Columbus, in the county of Franklin and State of Ohio, have invented certain new and useful Improvements in Beet-Toppers, of which the following is a specification, reference being had therein to the accompanying drawing.

The devices herein presented are improvements in machines for removing the leaves and the crowns from standing beets, and preparing the latter to be pulled from the ground. The mechanism, which I contemplate as an entirety, comprises devices for removing the larger parts of the leaves, then severing the crowns or upper parts of the beets, and then removing the severed crowns from the surface of the soil and finally forming piles or stacks of the crowns.

The features of improvement in the mechanism which are herein to be more particularly presented are those which relate to the topping cutter, the devices for gaging the cutter and the means which support the gaging devices and the cutter, and by which they can be adjusted to and supported in different positions.

Figure 1 of the accompanying drawings is a side elevation of a beet topping machine embodying my improvements, parts of such machine being broken away;

Fig. 2 is a top plan view of the machine, the driver's seat and its platform or support being removed;

Fig. 3 is a rear elevation of the machine, parts being in vertical section, and other parts omitted;

Fig. 4 is a central vertical longitudinal section taken through the central part of the machine, drawn to a larger scale than the views already described, and many of the parts being broken off;

Fig. 5 is a central horizontal section through the gage roller located above the topping knife, showing also related parts of the apparatus;

Fig. 6 is a sectional view illustrating the manner of mounting the vertical disk cutters;

Fig. 7 is a perspective view of the topping knife cutter; and

Fig. 7ª is a detail sectional view taken on the line 7ª—7ª of Fig. 7.

Figs. 8 and 9 are detail views that will be later referred to.

Fig. 10 is a broken perspective view showing the framework that carries the gage drum and topping knife and its relation to the main frame and other parts of the machine.

Fig. 11 is a vertical sectional view, on a larger scale, illustrating details of the frame shown in Fig. 10.

The machine illustrated in the drawings has two main side bars, A, A, which are preferably curved toward each other at the front so as to support between them the tongue B.

C, C indicate the supporting ground wheels, mounted upon a shaft D. The wheels are connected with the shaft by ratchet devices of any well known construction, conventionally indicated at E, and arranged to cause the shaft to turn with the wheels when they turn forwardly, but permitting them to revolve independently of the shaft when rotating in the opposite direction.

G designates a front cutter set above the level of the ground and arranged to sever the upstanding leaves of the plants. It is supported by a hanger bar H mounted so as to be free to slide vertically in the cross-bar *h* of the main frame.

This cutter G extends, with a single straight cutting edge, from one side of the machine across the beet row to the other side. The cutting edge is arranged to travel in planes a few inches above the tops of the beet roots, its purpose being to sever the vertical, or upstanding, leaves, (which constitutes the largest quantity of leaf material), and move them all in one direction and to one side of the machine. The tendency to laterally displace the machine is compensated by the disks which are angularly adjustable. Heretofore I have attempted to sever these upstanding leaves by means of two diverging cutters, but the varying action on the machine, as to the line of travel, presented a serious difficulty, which I have overcome by employing a front cutter (G), whose reaction is all in one direction.

I, I indicate a pair of vertically disposed cutters employed for severing the side and laterally extending leaves of the plants.

These cutters are preferably concavo-convex disks with cutting edges, and are caused to turn with the forward movement of the machine by engagement with the soil, and operate not only to sever the leaves, as stated, but also to form furrows at the sides of the row of plants so as to provide clearance for the ends of the following topping cutter, in the manner illustrated and explained in my Patent 1,026,714, issued May 21, 1912. The disks I are supported by a yoke-like frame that is free to slide upon a bolt K, which is preferably angular in cross section and with which the said yoke frame has such engagement that it is held from turning. The bolt is mounted at its upper end in the cross frame piece $a$ to which it is united by pins $k^2$, and at its lower end in a bearing $k$ formed at the lower ends of the bracing pieces $k'$.

The supporting yoke frame for the disks I preferably consists of a pair of horizontal arms F having hubs $f$ perforated to fit the bolt K (Fig. 9). These arms are spaced apart vertically and support hangers J, J (Fig. 8). Each hanger is formed with a pair of bearings $j$, $j$ that fit the arms F, F; and, at its lower end, supports, at $j'$, the adjustable disk carrier I' which is provided with an axle $i$ to which disk I is secured and on which it turns. The hangers J are adjustable upon the arms F so as to permit the disks I to be set closer together or farther apart, as may be desired, set screws or other securing means being employed for holding the parts in place after being properly adjusted. The disk carriers I' are also adjustable about the vertical axes of their supports $j'$, in order to permit the angles at which the disks are set, relative to the line of movement of the machine, to be varied, as may be required, set screws or other equivalent means being employed to hold the parts after this adjustment. By forming the disk-supporting frame as described every adjustment of the disks that may be required is provided for; and the parts of which it is composed are of exceedingly simple construction.

The means employed for controlling the vertical movements of the disks and their supporting frame will be later referred to.

The topping cutter L, which is of novel form, is located in rear of the disks I, I. It is approximately horizontal and is set at such level as to sever the crowns of the beets. It consists of two curved wings $l$, $l$, extending laterally from a central standard L', the forward edge of the lower portion of which latter is sharpened and formed into a cutting blade $l'$. The cutting edge of the knife is of curve shape, as indicated in Figs. 5 and 7, as I have found that decidedly better results are secured with a knife of this form than any other of which I have knowledge. The standard or support L' for the knife extends upward, preferably inclining somewhat toward the rear, and is secured to a bracket or angle plate $l^2$ that is attached to a cross bar L² that forms part of the vertically movable supporting frame for the topping cutter. The portion of the standard L' that is secured to the bracket $l^2$ is slotted, as indicated at $l^3$, and securing bolts $l^4$ pass through this slot and holes in the bracket and permit a fore-and-aft adjustment of the topping cutter as a whole. L³, L³ represent upright bars connected by the cross-bar L², and with it constituting the vertically movable frame for the topping cutter and the gage drum M. These upright bars L³ are arranged near the sides of the machine, preferably just inside of the longitudinal frame bars A.

The gage drum M, as an entirety, is an elongated transversely arranged device of such length that it will not only roll over those beets which are in their intended, normally central, position, but will also contact with those which may be out of line either to an extreme on the right hand or an extreme on the left hand.

The upright bars L³ and the rigidly attached cross bar L² constitute a supplemental frame which is free to move up and down within predetermined limits and in correspondence with variations of the surface of the ground or in the upper projecting parts of the beets. This supplemental frame carries the topping cutter, and its gaging drum.

This drum consists of a series of disks or wheels $m$ spaced apart from each other and all secured to the shaft M' which extends from side to side of the machine. At its ends it is mounted in bearings $m'$ which are fitted in the slots shown in the lower ends of the uprights L³ of the supplemental frame.

A rotary disk M² mounted on the shaft M' and carrying a series of cutting projections $m^2$, works against the front upright cutting edge $l'$, coöperating therewith to produce a series of successive shearing cutting operations as the disk revolves.

It is found that leaves, stems and other trash material collect against the supporting standard or standards of the topping cutter, more especially when a single central standard is employed, as herein illustrated, in sufficient amount to interfere with the operation of the topping cutter. I therefore form the support or standard L' with the front cutting edge to sever this material as it collects, allowing it to pass easily to the rear, and I supplement the cutting action of the said upright cutter by the rotating cutter, M², described.

N represents the cleaner for the gage wheel. It consists of a set of fingers supported by a cross piece and extending between the wheels or disks of the drum. The supporting frame, L², L³, L³, for the topping knife and its gage drum, is, as has been stated, free to move vertically, and I will now describe the manner in which it is supported.

O, O' represent parallel radius bars. They are supported at their forward ends respectively by brackets o, o', and are connected at their rear ends to the said vertically movable frame. The upper bars O have adjustable connections with the uprights L³, preferably consisting in bolts o³ fitting the slots o² in the bars; while the lower radius bars, O', are secured, in any suitable manner, fast to the bearings m' for the shaft of the gage drum. The bars O, O' are connected near their rear ends by a bar O². It will be seen from the foregoing description that the topping knife frame is thus supported by a parallel link arrangement which insures that the determined plane of the knife relative to the horizon shall be maintained under all conditions of vertical adjustment. It has heretofore been customary to swing the topping cutter frame about a horizontal pivot, with the result that the inclination of the knife was changed at each change in its elevation, and the plane on which the knife severed the top was constantly being shifted. If the blade be lifted high to top a beet standing considerably out of the ground, its cutting edge, under former conditions, was presented at too great a downward inclination, with the result that a clean severing of the top would not result, the beet being broken off along its forward edge. On the other hand, when the knife was lowered to top a low lying beet, its edge not infrequently was presented at too little an inclination, with the result that it would ride over the top of the beet, failing entirely to sever the crown.

By the method of mounting the topping cutter which I have herein described, the knife may be adjusted to the proper angle for topping most advantageously, and it will then be maintained at that angle, however the frame that carries it be adjusted in operation.

A further advantage incident to mounting the gage drum and cutter as described is that the drum is always entirely free to rise and fall quickly, carrying with it the knife which, as stated, is maintained at the desired angle for topping, there being nothing that can possibly act as a positive stop to the said free rising and falling movements of the gage drum, as would be the case were guides employed in which the vertically movable frame slides.

In order to change the angle of the topping blade with reference to the horizon, I interpose turn buckles P, P, in the radius bars O, O'. By these means one of the rods may be lengthened and the other correspondingly shortened, with the result that the knife frame and the knife will be tilted, as may be found desirable.

In order that the gage wheel may be adjusted toward or from the topping cutter L, I connect screw-threaded rods R, R, with the bearings m' for the shaft of the gage wheel and extend them through the cross plate L². Set nuts r upon the screw-threaded parts of the rods R engage with the opposite faces of the plate L² and provide means for adjusting the gage wheel and securing it after adjustment.

As shown in Fig. 1 the bearings m' are mounted in slots in the lower ends of the plates L³, thus providing for the adjustment just described.

As the crowns of the beets and such leaves as remain attached thereto are valuable as cattle feed, I provide means for collecting them. In rear of the topping cutter and preferably close thereto, is a deflector S arranged to remove the severed crowns, taking them from the ground, as left by the topping cutter, and delivering them to conveyers by which they may be transported to a collecting receptacle.

This receptacle is supported on a laterally projecting frame extension and is so arranged that the masses of crowns received and carried thereby can be delivered at suitable points between one beet row and the next row.

The deflector or device for accomplishing the work of throwing the crowns laterally and lifting them, relatively, comprises a series of rows of brush tufts mounted upon a shaft and revolving in transverse planes, that is, planes at right angles to the path of the machine, and immediately behind those of the above described cutter.

T represents a conveyer to which the said deflector S delivers. It is inclined, its inner end being supported by a chain T', and its upper outer end delivering into a collecting receptacle U. The conveyer consists preferably of a pair of endless belts, the contiguous faces of which move in the same direction—upward toward the collecting receptacle U. The upper belt conveyer is designated t, and the lower one t'.

The several parts of the apparatus thus far described, that is to say, the forward cutter G, the vertical disk cutters I, the topping cutter L, and its gage wheel, the deflector S, and the lower end of the lateral conveyer T, are all connected with mechanism by which they may be vertically adjusted, it being understood that these parts are lifted relatively high above the ground when the machine is being transported or is making a turn at the end of a row.

W designates a hand operated latch lever of the kind in common use upon agricultural machinery. It is connected by a link w with a cross shaft W', that is provided with an arm $w'$ which is connected by a link $w^2$ with the yoke frame that supports the vertical cutters I, I. The lower end of the link $w^2$ is formed into a loop or eye $w^3$ that surrounds the bolt K and lies between the hubs of the two horizontal arms F, F, as indicated in Figs. 2 and 4. A spring V surrounding the bolt K is interposed between the loop of the link $w^2$ and the lower set of horizontal arms F, pressing downward upon the hub of the said arms and operating to force the vertical disk cutters I into the soil. The tension of this spring can be adjusted by varying the position of the lever W. When it is desired to elevate the cutting disks I the lever is shifted so as to bring the loop $w^3$ into lifting engagement with the hub of the upper set of arms F.

X is a latch lever similar to the lever W. It is secured to a cross shaft X' from which extend arms $x$, $x$, that are connected by links $x'$ with the cross-bar $L^2$ of the topping cutter and gage wheel frame. The links $x'$ and the arms from which they hang thus become the suspending means for this frame. The connection between the links $x'$ and the bar $L^2$ is loose so that this frame as a whole may easily rise relative to its said suspending devices. Springs $x^3$ surround the links $x'$, being interposed between the arms $x$ and the cross-piece $L^2$, and tend to quickly restore the parts to normal working conditions, supplementing gravity in this respect.

The tension of the springs $x^3$ may be varied by shifting the position of the hand lever X. When the topping cutter and its frame as a whole are to be elevated, the lever X is thrown forward.

I will next describe the means by which the several parts of the apparatus may be driven.

A sprocket wheel 2 secured fast to the main axle D is connected by a chain 3 with a pinion 4 upon a cross shaft 5 mounted in the forward part of the framework of the machine. The gage drum is driven directly from the shaft 5 by means of sprocket chains 14, 14, one at each side of the wheel, such chains engaging with wheels 16 on the shaft 5 and wheels 15 on the axle of the gage drum. It will be seen that one of the parallel links or radius bars for the frame of the gage drum is supported at its forward end on the shaft 5 which insures that the tension upon the drive chain 14 shall not be varied, as the gage drum moves up and down.

The cross shaft 5 is connected through bevel gearing 6 and 7, with a longitudinal shaft 9, from which the deflector S and conveyer T receive their motions. This shaft, 9, is connected by a belt or drive chain 10 with the shaft of the outer roller of the upper conveyer belt. The lower conveyer belt is driven directly from the upper belt through gearing 8.

12 designates the belt that drives the deflector S, it connecting the shaft thereof with the shaft 9.

By constructing the gage drum of the interrupted or spaced-apart disk form herein shown it is possible to carry the supporting standard for the topping cutter directly through such drum, it lying between two adjacent disks thereof. This is of advantage, since it allows the topping cutter to be disposed below the gage drum in the most desirable position, and also permits the standard to be secured thereto in such way as to support it to the best advantage.

I am aware of the fact that parallel rule joints, broadly considered, have been used for the supporting of cutters and gage wheels in beet topping machines; and I do not broadly claim the use of such devices.

But I believe myself to be the first to have provided the arrangement and combination of parts which is above described; that is to say, a main wheel-supported frame, a supplemental H-shaped frame having uprights $L^3$ braced by the side parts of the main frame, the rigid cross bar $L^2$, the elongated transversely arranged gage drum having a shaft extended across the machine from one upright $L^3$ to the other with bearings vertically adjustable therein; and the first to combine with such supplemental frame the two pairs of parallel link rods pivotally connected at their forward front ends to the main frame and connected to the uprights of the supplemental frame by a pivoting mechanism which is vertically adjustable with the drum, the cutter carried by the supplemental frame; and adjustable devices, such as described, for suspending the supplemental frame from the main frame.

What I claim is:—

1. The combination of the main frame, the supplemental transversely arranged vertically movable H-shaped frame having the upright $L^3$ adjacent to and braced by the side bars of the main frame and the cross bar $L^2$ intermediate of the ends of, and rigidly secured to, the uprights, the rotary transversely elongated gage drum having a shaft mounted in the said uprights, the cross shaft X' mounted on the main frame, the frame-suspending arms $x$ carried by the said shaft, the links loosely connecting the cross bar of the supplemental frame with the said arms $x$, the springs $x^3$ interposed between the supplemental frame and the arms, and the topping cutter secured to the supplemental frame independently of the gage drum, said parts being arranged substantially as set forth, whereby the gage drum and the topping cutter are braced laterally against the side bars of the main frame and can rise and fall independently of the arms x but are positively limited in their downward movement by said arms.

2. The combination of the main frame, the supplemental vertically movable longitudinally vibratable frame comprising the uprights bearing laterally against and braced by the side bars of the main frame and the cross bar rigidly secured to the uprights, the elongated transversely arranged gage drum having a shaft extending from one of said uprights to the other and mounted in vertically adjustable bearings therein, the two pairs of parallel link rods, one pair at each side of the machine, the rods being pivotally connected at their front ends to the main frame and the rear ends of the rods of each pair being joined by pivotal connections to an upright on the supplemental frame, all of said pivotal connections being vertically adjustable, and the topping cutter longitudinally adjustably secured to the supplemental frame independently of the gage drum.

3. The combination of the main frame, the transversely arranged frame having uprights adjacent to and braced by the side bars of the main frame and movable freely vertically and longitudinally relatively to the main frame and having the cross bar L² rigidly secured to the uprights, the transversely arranged elongated gage drum carried by the said supplemental frame and vertically movable with said frame and also independently thereof, the cutter below the drum secured to the supplemental frame and adjustable independently thereof longitudinally of the machine, the two pairs of elongated parallel links pivotally connected at their front ends to the supplemental frame and the rear ends of the two links of each pair being pivotally connected to one of the uprights by vertically adjustable pivotal connections, the means for suspending the supplemental frame from the main frame adapted to permit the supplemental frame to rise and to limit its downward movement with a positive stop at a predetermined point.

4. In a machine for topping root crops, the combination of a substantially horizontal topping cutter, an upright standard for supporting the cutter, the forward edge of which is sharpened to form a cutter, and a movable cutter coöperating with the said sharpened edge of the standard to produce a shearing cut action.

5. In a machine for topping root crops, the combination of a substantially horizontal topping cutter, an upright standard for supporting the cutter, the forward edge of which is sharpened, and a rotating disk lying close against the said sharpened edge of the standard and coöperating therewith to form a shearing cutter.

6. In a machine for topping root crops, the combination of a topping cutter and a central standard supporting the same, the forward edge of the standard being sharpened, a gage drum directly above the knife, and a rotating blade carried by the gage drum working against the cutting edge of the vertical standard.

7. In a machine for topping root crops, the combination of a horizontally disposed topping cutter, a gage drum above the cutter, and a central standard for supporting the cutter extending upward through the said drum.

8. In a machine for topping root crops, the combination of a horizontally disposed topping knife, a gage drum above the knife consisting of a series of disks spaced apart, and a central standard for supporting the cutter extending upward through the drum between two of the said disks.

In testimony whereof, I affix my signature, in presence of two witnesses.

GEORGE H. SMITH.

Witnesses:
T. A. SMITH,
CHARLES M. VALLANDINGHAM.